US007929238B1

(12) United States Patent
Vasquez (10) Patent No.: US 7,929,238 B1
(45) Date of Patent: Apr. 19, 2011

(54) DISK DRIVE SEEKING WITH A FIXED RATE CLOCK WHEN CROSSING SERVO ZONES TO FACILITATE ZONED SERVO SECTORS

(75) Inventor: Steven R. Vasquez, Rancho Santa Margarita, CA (US)

(73) Assignee: Western Digital Technologies, Inc., Irvine, CA (US)

( * ) Notice: Subject to any disclaimer, the term of this patent is extended or adjusted under 35 U.S.C. 154(b) by 289 days.

(21) Appl. No.: 12/251,219

(22) Filed: Oct. 14, 2008

(51) Int. Cl.
*G11B 5/09* (2006.01)

(52) U.S. Cl. .......................................... 360/51

(58) Field of Classification Search .......................... None
See application file for complete search history.

(56) References Cited

U.S. PATENT DOCUMENTS

| | | |
|---|---|---|
| 5,418,659 A | 5/1995 | Shergill |
| 5,796,535 A | 8/1998 | Tuttle et al. |
| 5,956,196 A | 9/1999 | Hull et al. |
| 6,084,738 A | 7/2000 | Duffy |
| 6,118,604 A | 9/2000 | Duffy |
| 6,178,056 B1 | 1/2001 | Cloke et al. |
| 6,262,857 B1 | 7/2001 | Hull et al. |
| 6,411,452 B1 | 6/2002 | Cloke |
| 6,441,981 B1 | 8/2002 | Cloke et al. |
| 6,487,032 B1 * | 11/2002 | Cloke et al. ............... 360/51 |
| 6,519,104 B1 * | 2/2003 | Cloke et al. ............... 360/51 |
| 7,012,773 B2 | 3/2006 | Ashikaga et al. |
| 7,054,083 B2 * | 5/2006 | Ehrlich ...................... 360/48 |
| 7,072,128 B2 * | 7/2006 | Ehrlich ...................... 360/48 |
| 7,075,742 B2 * | 7/2006 | Ehrlich ...................... 360/48 |
| 7,092,177 B2 * | 8/2006 | Ehrlich ...................... 360/48 |
| 7,405,893 B2 * | 7/2008 | Bi et al. ..................... 360/48 |
| 7,518,819 B1 * | 4/2009 | Yu et al. ................ 360/78.14 |
| 7,561,371 B2 * | 7/2009 | Mori et al. ............. 360/77.08 |
| 7,715,138 B1 * | 5/2010 | Kupferman ................ 360/51 |
| 2007/0064325 A1 | 3/2007 | Bi et al. |
| 2008/0304172 A1 * | 12/2008 | Bi et al. ...................... 360/48 |

* cited by examiner

*Primary Examiner* — Hoa T Nguyen
*Assistant Examiner* — James L Habermehl (57) ABSTRACT

A disk drive is disclosed comprising a disk having a plurality of servo sectors defining a plurality of servo tracks that form a plurality of servo zones. The disk drive further comprises a head actuated radially over the disk for generating a read signal, and control circuitry operable to execute a seek operation. A fixed rate clock is generated, and a disk locked clock is generated and synchronized to the servo data rate of the servo zone the head is over. The disk locked clock is used to generate a servo timing window relative to a circumferential location of the head and the servo sectors. The control circuitry seeks the head from the first servo zone to the second servo zone, and switches to the fixed rate clock to generate the servo timing window while the head transitions from the first servo zone to the second servo zone.

20 Claims, 6 Drawing Sheets

DISK DRIVE SEEKING WITH A FIXED RATE CLOCK WHEN CROSSING SERVO ZONES TO FACILITATE ZONED SERVO SECTORS

BACKGROUND

Disk drives comprise a disk and a head connected to a distal end of an actuator arm which is rotated about a pivot by a voice coil motor (VCM) to position the head radially over the disk. The disk comprises a plurality of radially spaced, concentric tracks for recording user data sectors and servo sectors. The servo sectors comprise head positioning information (e.g., a track address) which is read by the head and processed by a servo control system to control the velocity of the actuator arm as it seeks from track to track.

Because the disk is rotated at a constant angular velocity, the user data rate is typically increased toward the outer diameter tracks (where the surface of the disk is spinning faster) in order to achieve a more constant linear bit density across the radius of the disk. To simplify design considerations, the data tracks are typically banded together into a number of physical zones, wherein the user data rate is constant across a zone, and increased from the inner diameter zones to the outer diameter zones. This is illustrated in FIG. 1A, which shows a prior art disk format 2 comprising a number of data tracks 4, wherein the data tracks are banded together in this example to form three physical zones from the inner diameter of the disk (Z0) to the outer diameter of the disk (Z2).

Figure 1A:
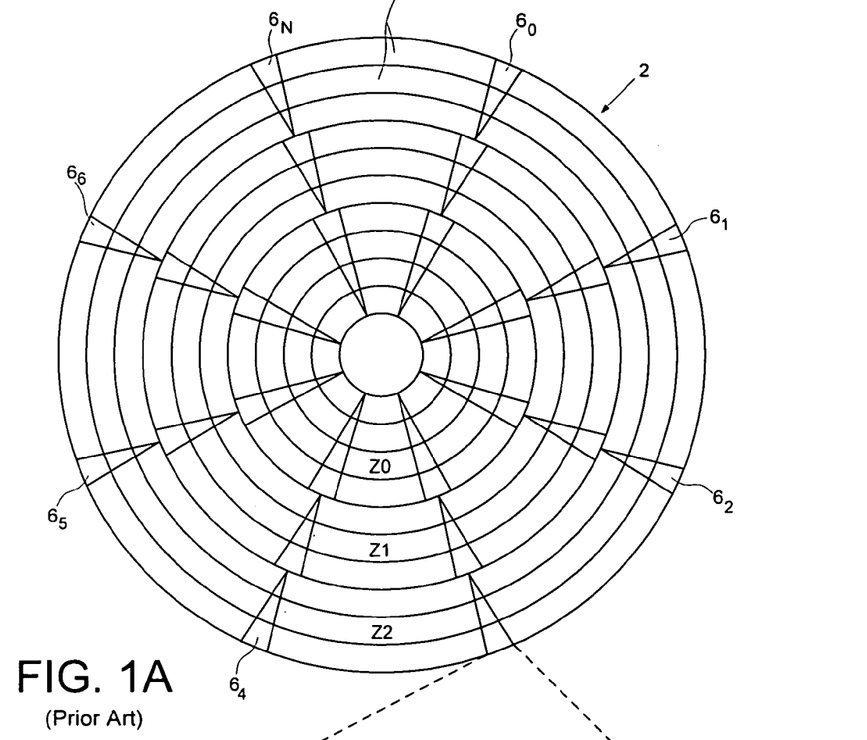
FIG. 1A shows a prior art format of a disk comprising a plurality of zoned servo sectors.

The prior art disk format of FIG. 1A also comprises a number of servo sectors $6_0$-$6_N$ recorded around the circumference of each data track. Each servo sector 6, may comprise a preamble 8 for storing a periodic pattern, which allows proper gain adjustment and timing synchronization of the read signal, and a sync mark 10 for storing a special pattern used to symbol synchronize to a servo data field 12. The servo data field 12 stores coarse head positioning information, such as a track address, used to position the head over a target data track during a seek operation. Each servo sector $6_i$ may further comprise groups of servo bursts 14 (e.g., A, B, C and D bursts), which comprise a number of consecutive transitions recorded at precise intervals and offsets with respect to a data track centerline. The groups of servo bursts 14 provide fine head position information used for centerline tracking while accessing a data track during write/read operations.

Figure 1B:
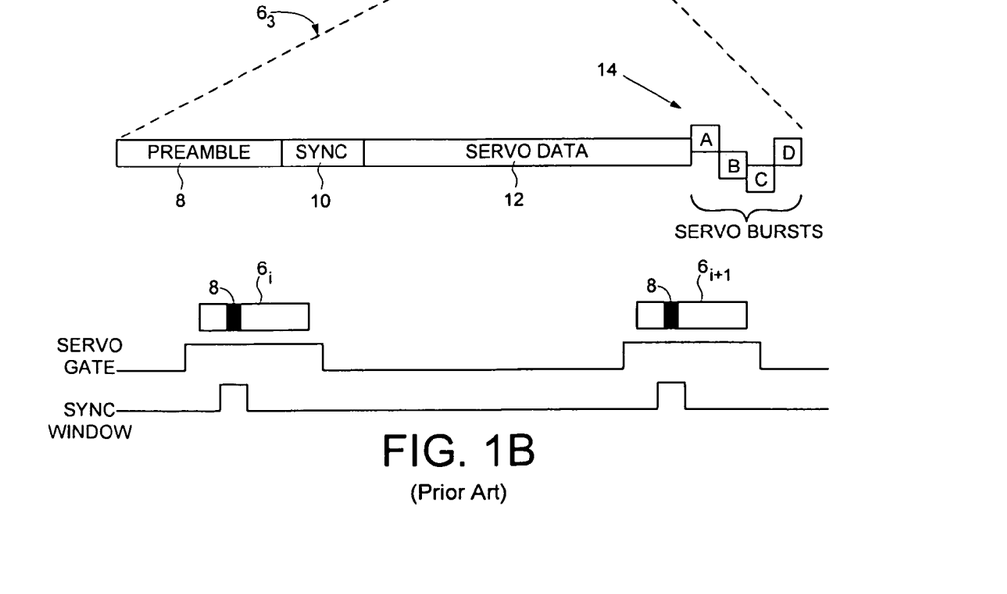
FIG. 1B shows a prior art technique for generating a servo gate window as the head approaches a servo sector and a sync mark window as the head approaches a servo sync mark.

In the embodiment of FIG. 1A, the data rate of the servo sectors $6_0$-$6_N$ changes in each physical zone similar to the data sectors in order to improve format efficiency. However, a zoned servo sector format may be problematic when generating the servo timing windows for detecting the servo sectors (e.g., the servo gate window and the sync mark window as shown in FIG. 1B). If the servo timing windows are generated using the synchronous clock of the servo channel (the disk locked clock), the servo frequency synthesizer may create a transient in the servo timing windows during a zone-crossing seek operation. That is, when the head crosses a servo zone boundary and the servo frequency synthesizer is reprogrammed to operate at the new zone frequency, there may be a transient (a time shift) in the timing windows resulting in loss of servo synchronization.

DETAILED DESCRIPTION OF EMBODIMENTS OF THE INVENTION

Figure 2A:
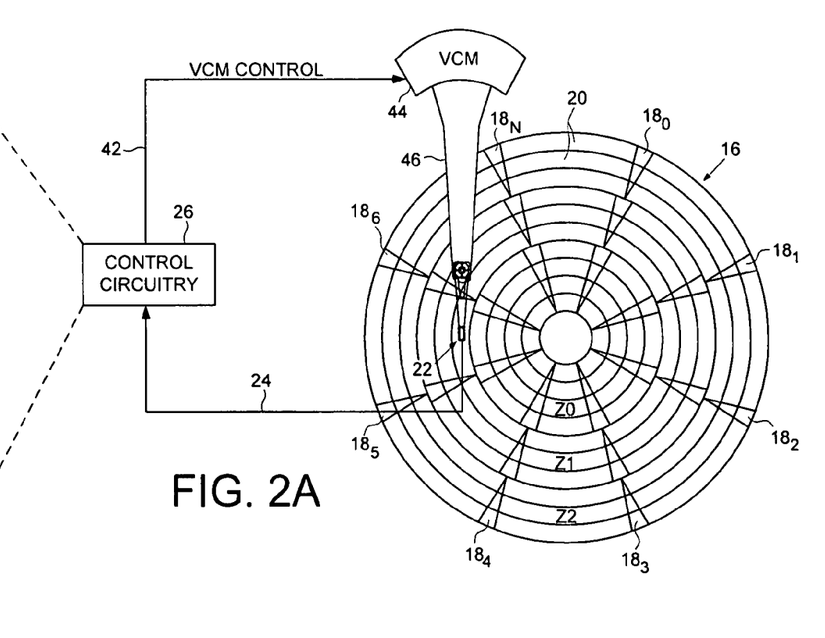
FIG. 2A shows a disk drive according to an embodiment of the present invention comprising a head actuated over a disk and control circuitry.

FIG. 2A shows a disk drive according to an embodiment of the present invention comprising a disk 16 having a plurality of servo sectors $18_0$-$18_N$ defining a plurality of tracks 20, wherein each servo sector 18, comprises a servo sync mark. The servo tracks 20 form a plurality of servo zones (e.g., Z1-Z3), wherein a servo data rate of the servo sectors in a first servo zone is different than a servo data rate of the servo sectors in a second servo zone. The disk drive further comprises a head 22 actuated radially over the disk 16 for generating a read signal 24, and control circuitry 26 operable to execute the flow diagram of FIG. 2B to perform a seek operation. A fixed rate clock is generated (step 28), and a disk locked clock is generated and synchronized to the servo data rate of the servo zone the head is over (step 30). The disk locked clock is used to generate a servo timing window relative to a circumferential location of the head and the servo sectors (step 32). The control circuitry seeks the head from the first servo zone to the second servo zone (step 34), and switches to the fixed rate clock (step 36) to generate the servo timing window while the head transitions from the first servo zone to the second servo zone (step 38). After the head 22 transitions into the second servo zone, the control circuitry 26 switches back to the disk locked clock to generate the servo timing window (step 40).

In the embodiment of FIG. 2A, the control circuitry 26 processes the read signal 24 emanating from the head 22 to demodulate the embedded servo sectors $18_0$-$18_N$ and generate a position error signal (PES) representing a radial offset of the head 22 from a target track 20. The control circuitry 26 processes the PES with a suitable servo compensator to generate a control signal 42 applied to a voice coil motor (VCM) 44. The VCM 44 rotates an actuator arm 46 about a pivot in order to actuate the head 22 radially over the disk 16 in a direction that decreases the PES.

Figures 3A, 3B:
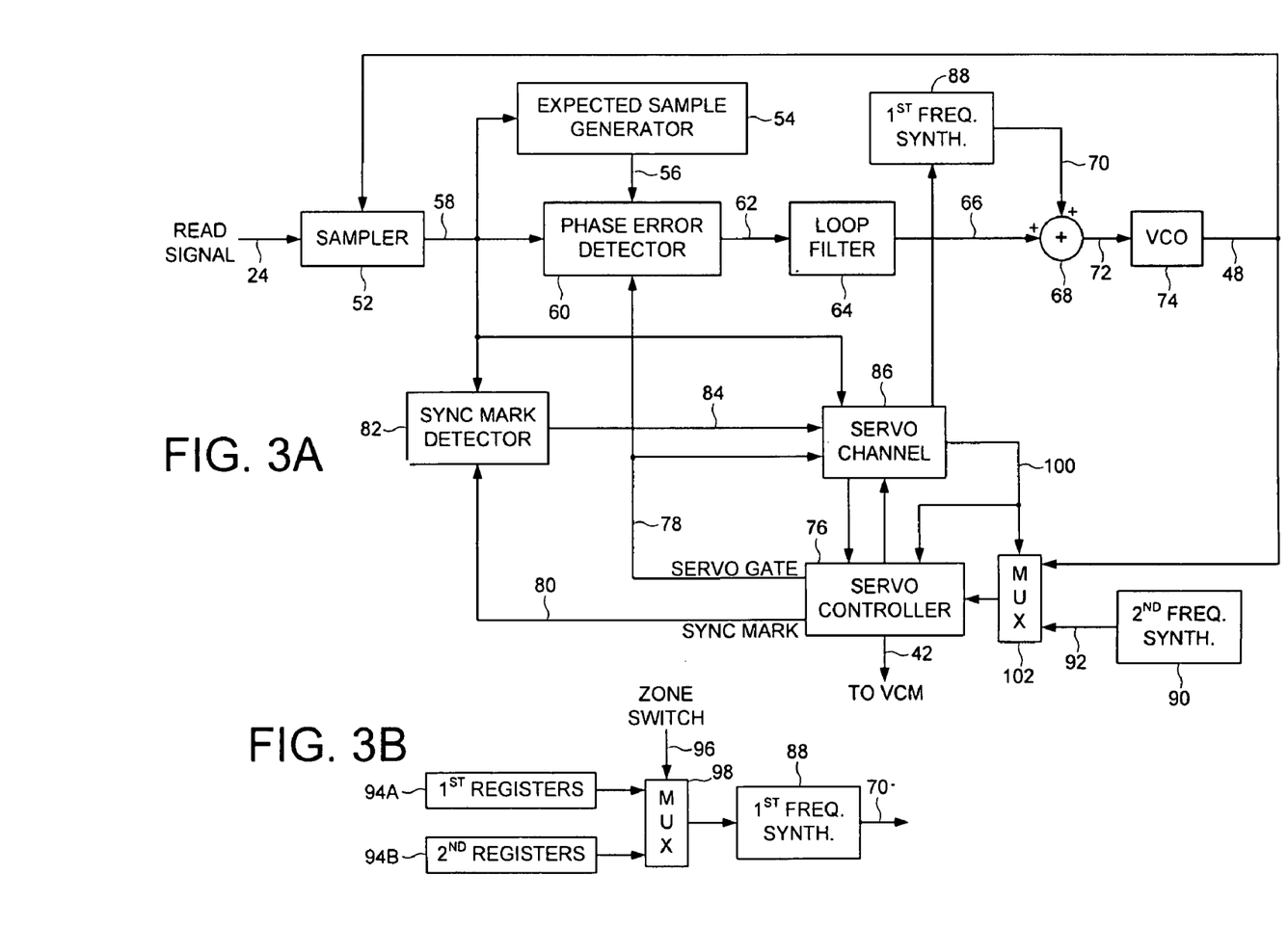
FIG. 3A shows control circuitry according to an embodiment of the present invention including timing circuitry clocked by a disk locked clock, and servo control circuitry clocked by the disk locked clock and a fixed clock.
FIG. 3B shows control circuitry according to an embodiment of the present invention wherein a servo frequency synthesizer generates a center control signal relative to the servo zone the head is over.

FIG. 3A shows control circuitry 26 according to an embodiment of the present invention including a timing circuit for generating the disk locked clock 48. The timing circuit comprises a phase locked loop (PLL) for synchronizing a sampling device 52 to the data rate of the read signal 24. An expected sample generator 54 generates expected samples 56 corresponding to a target response (e.g., a suitable partial response) relative to the read signal samples 58. A phase detector 60 generates a phase error 62 in response to the expected samples 56 and the read signal samples 58. The phase error 62 is filtered with a suitable compensation filter 64 to generate a control signal 66. The control signal 66 is added 68 to a center frequency 70 to generate a frequency control signal 72 applied to a voltage controlled oscillator (VCO) 74. The output 48 of the VCO 74 is the disk locked clock which adjusts the frequency of the sampling device 52 until the read signal 24 is sampled synchronously.

Any suitable technique may be employed to implement the phase error detector 60 in the timing circuit. For example, the phase error may be generated using a suitable trigonometric identity, or a suitable digital signal processing algorithm such as the Discrete Fourier Transform (DFT). In addition, other embodiments of the timing circuit may be employed in the embodiments of the present invention, such as an interpolating timing circuit wherein the read signal is sampled asynchronously and the asynchronous read signal samples interpolated using an interpolation filter to generate the synchronous read signal samples.

In the embodiment of FIG. 3A, the control circuitry further comprises a servo controller 76 which generates the servo timing window, such as a servo gate window 78 and a sync mark window 80. The servo gate window 78 enables the phase error detector 60 as the head 22 approaches a servo sector, and the sync mark window 80 enables a sync mark detector 82 to begin searching for the servo sync mark in the servo sector. The sync mark detector 82 generates a sync mark detected signal 84 which enables a servo channel 86 to demodulate the servo information, such as the servo track address and the servo bursts in the servo sector. The servo controller 76 processes the demodulated servo information in order to generate the control signal applied to the VCM 44.

In the embodiment of FIG. 3A, a first frequency synthesizer 88 (a servo frequency synthesizer) generates the center frequency 70 for the VCO 74 corresponding to the servo data rate of the servo zone the head 22 is over. A second frequency synthesizer 90 generates the fixed rate clock 92 applied to the servo controller 76 while the head 22 seeks across a servo zone boundary. In an embodiment shown in FIG. 3B, the servo frequency synthesizer 88 is programmed using a first and second set of registers 94A and 94B as the head 22 passes over a servo zone boundary. For example, registers 94A may be programmed with values corresponding to a current servo zone, and registers 94B may be programmed with values corresponding to a next servo zone. When the head 22 passes over the servo zone boundary, a zone switch signal 96 selects registers 94B via multiplexer 98 to program the servo frequency synthesizer 88 to output a center frequency 70 corresponding to the new servo zone. Switching to the fixed rate clock 92 to generate the servo gate window 78 and the sync mark window 80 accounts for the transient in the disk locked clock 48 caused by reprogramming the servo frequency synthesizer 88 to operate in the next servo zone.

In one embodiment, the servo channel 86 generates a clock switch signal 100 to apply the fixed rate clock 92 via multiplexer 102 to the servo controller 76. The servo controller 76 comprises suitable conversion circuitry for generating the timing windows (the servo gate window 78 and sync mark window 80) in a manner that accounts for the frequency difference between the fixed rate clock 92 and the disk locked clock 48. In an alternative embodiment, the servo controller 76 may comprise first and second timing generators for generating first and second timing windows (e.g., servo gate window 78 and sync mark window 80) in response to the disk locked clock 48 or the fixed rate clock 92. In this embodiment, the multiplexer 102 in FIG. 3A selects between the first or second timing windows as the output of the servo controller 76 based on the state of the clock switch signal 100.

In one embodiment, the servo channel 86 activates the clock switch signal 100 at a reference point that enables the servo controller 76 to maintain proper timing relative to the servo sectors. In an embodiment shown in FIG. 4A, the clock switch signal 100 is activated on the rising edge of the servo gate window 78 just prior to reading a servo sector of the current servo zone. This establishes a reference point for the servo controller 76 to generate the servo timing window(s), such as the servo gate window 78 and/or the sync mark window 80, for the next servo sector using the fixed rate clock 92.

Figure 4A:
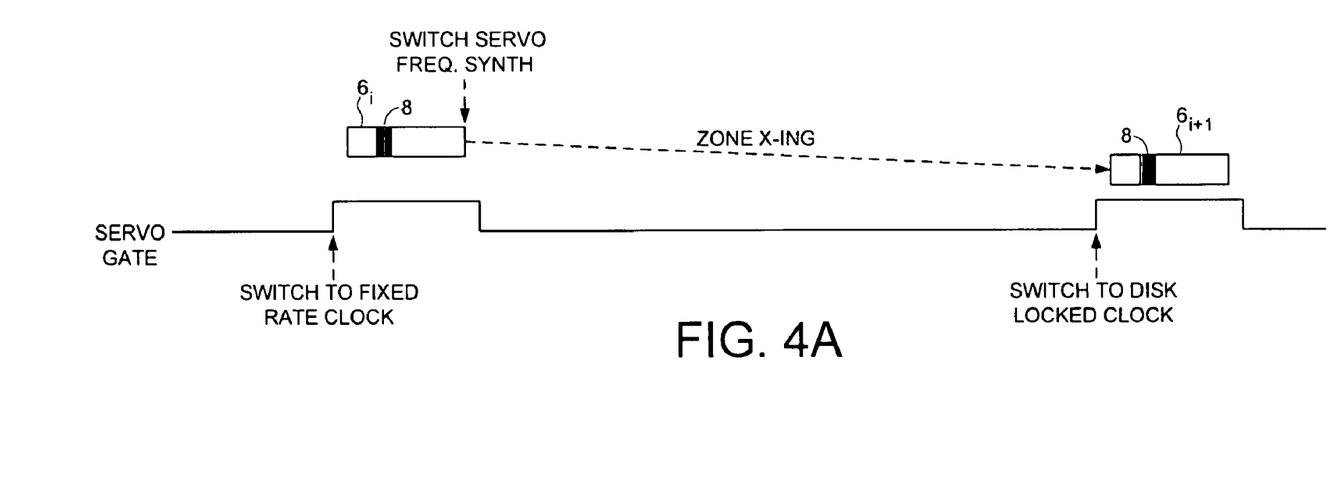
FIG. 4A shows an embodiment of the present invention wherein the control circuitry switches to the fixed rate clock at the rising edge of the servo gate window, and programs the servo frequency synthesizer with a center control signal corresponding to the next servo zone at the falling edge of the servo gate window.

In one embodiment, the servo channel 86 may activate the clock switch signal 100 to select the fixed rate clock 92 just prior to processing the last servo sector of the current servo zone prior to crossing into the next servo zone as shown in FIG. 4A. In an alternative embodiment, the servo channel may activate the clock switch signal 100 prior to starting the seek operation while the head 22 is tracking a current track of the current servo zone.

FIG. 4A also illustrates an embodiment of the present invention wherein the zone switch signal 96 is operable to configure the servo frequency synthesizer 88 to operate in the next servo zone after processing the last servo sector of the current servo zone. This embodiment allows the time between servo sectors 6, to $6_{i+1}$ for the servo frequency synthesizer 88 to settle to the frequency of the next servo zone.

In one embodiment, the clock switch signal 100 applies the disk locked clock 48 to the servo controller 76 at the rising edge of the servo gate window 78 as the head approaches the first servo sector $6_{i+1}$ of the next servo zone as illustrated in FIG. 4A. Switching back to the disk locked clock 48 at the rising edge of the servo gate window 78 provides a reference point for the servo controller 76 to begin generating the servo timing window(s), such as the servo gate window 78 and/or the sync mark window 80, based on the disk locked clock 48.

In one embodiment, the servo channel 86 may activate the clock switch signal 100 to select the disk locked clock 48 just prior to processing the first servo sector of the next servo zone after crossing into the next servo zone as shown in FIG. 4A. In an alternative embodiment, the servo channel may activate the clock switch signal 100 at the end of the seek operation while the head 22 is settling on the target track of the target servo zone.

If the head 22 crosses multiple servo zones during a seek operation, in one embodiment the servo channel 86 may apply the fixed rate clock 92 to the servo controller 76 only while the head 22 is crossing each servo zone. In an alternative embodiment, the servo channel 86 may apply the fixed rate clock 92 to the servo controller 76 until the head 22 reaches the target servo zone.

In the embodiment of FIG. 3B, if the head 22 crosses multiple servo zones during a seek operation, registers 94A and 94B are programmed in an interleaved manner as the head 22 crosses into each new servo zone. This embodiment assumes the registers 94A and 94B can be programmed in the time it takes the head 22 to cross over a servo zone. In an alternative embodiment, the control circuitry 26 may comprise a register (or registers) corresponding to the frequency of each servo zone, and the corresponding register selected as the head 22 crosses into each servo zone.

Figure 4B:
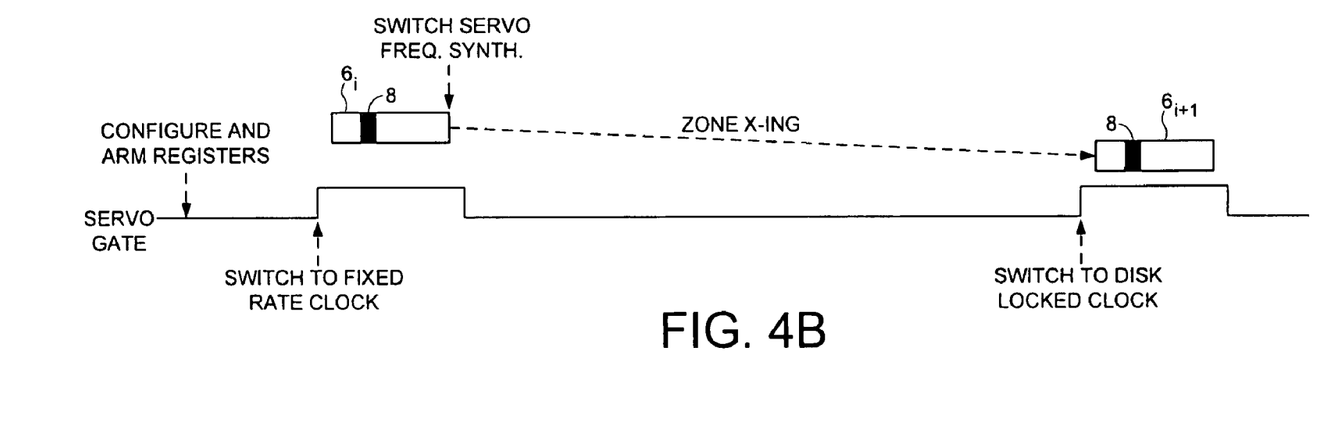
FIG. 4B shows an embodiment of the present invention wherein the control circuitry arms registers for programming the servo frequency synthesizer to operate at the frequency of the next servo zone.

FIG. 4B illustrates an embodiment of the present invention wherein the control circuitry 26 configures and arms registers 94A or 94B for programming the servo frequency synthesizer 88 some time prior to the head 22 crossing into the next servo zone. In this manner, when the triggering event occurs (such as processing the end of a servo sector at the end of the current servo zone), the zone switch signal 96 is activated to configure the servo frequency synthesizer 88 corresponding to the frequency of the next servo zone with minimal delay.

Figure 5A:
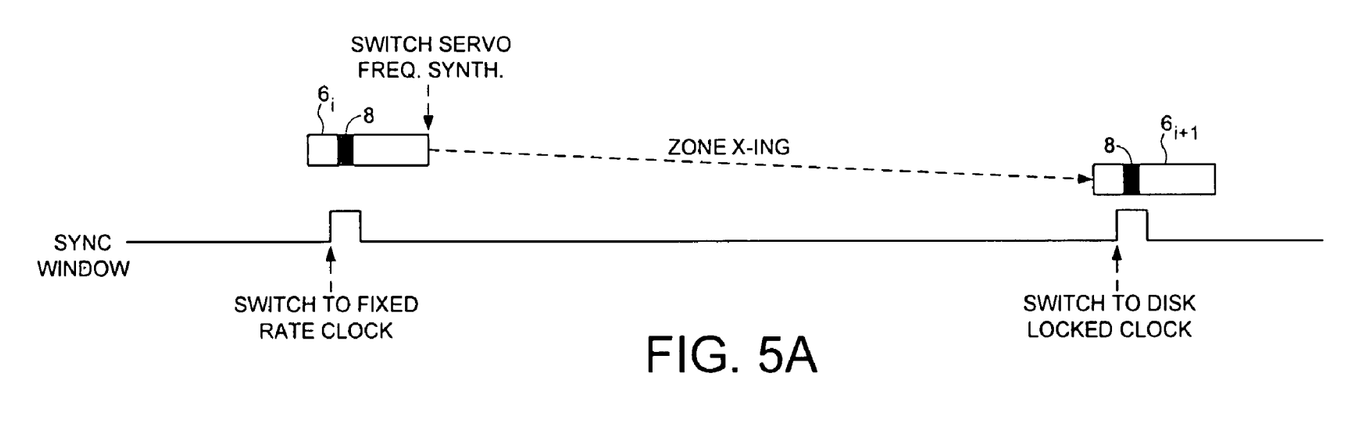
FIGS. 5A and 5B show an embodiment of the present invention wherein the control circuitry switches to the fixed rate clock at the rising edge of the sync mark window.
Figure 5B:
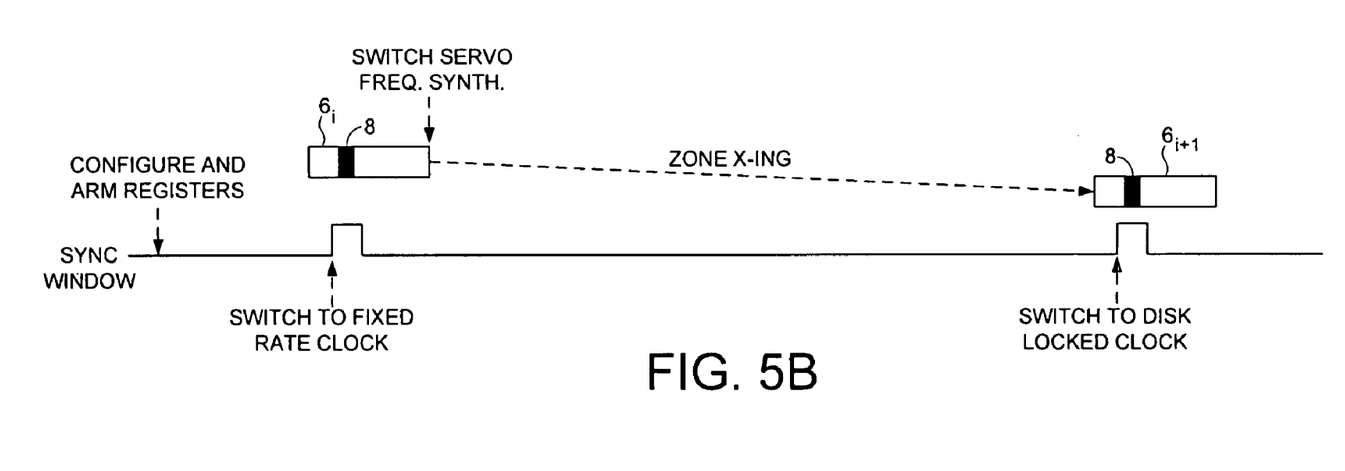

The control circuitry 26 may switch between the disk locked clock 48 and the fixed rate clock 92 in response to any suitable timing signal. In an embodiment illustrated in FIG. 5A, the control circuitry 26 switches between the disk locked clock 48 and the fixed rate clock 92 in response to the sync mark window 80. Similar to the servo gate window 78, the sync mark window 80 can provide a reference point for the servo controller 76 to generate the servo timing windows (e.g., the servo gate window 78 and/or the sync mark window 80). FIG. 5B shows an embodiment similar to FIG. 4B wherein the control circuitry 26 configures and arms registers 94A or 94B in order to configure the servo frequency synthesizer 88 to operate in the next servo zone.

Figure 2B:
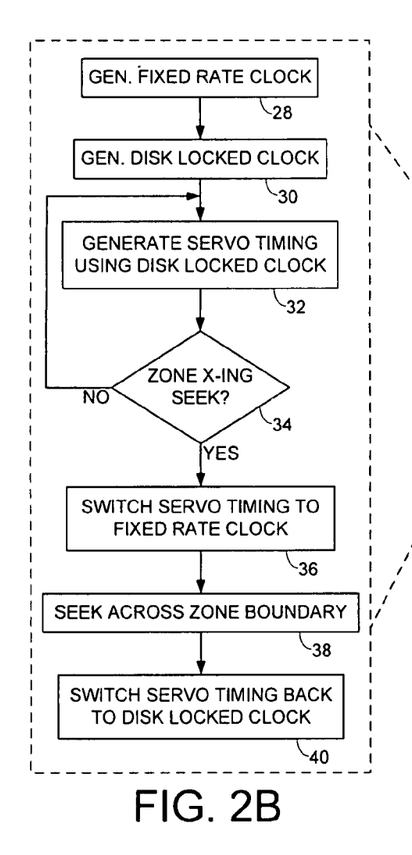
FIG. 2B is a flow diagram executed by the control circuitry according to an embodiment of the present invention wherein the servo gate and sync mark window are generated in response to a fixed rate clock when the head crosses a servo zone boundary.
Figure 6:
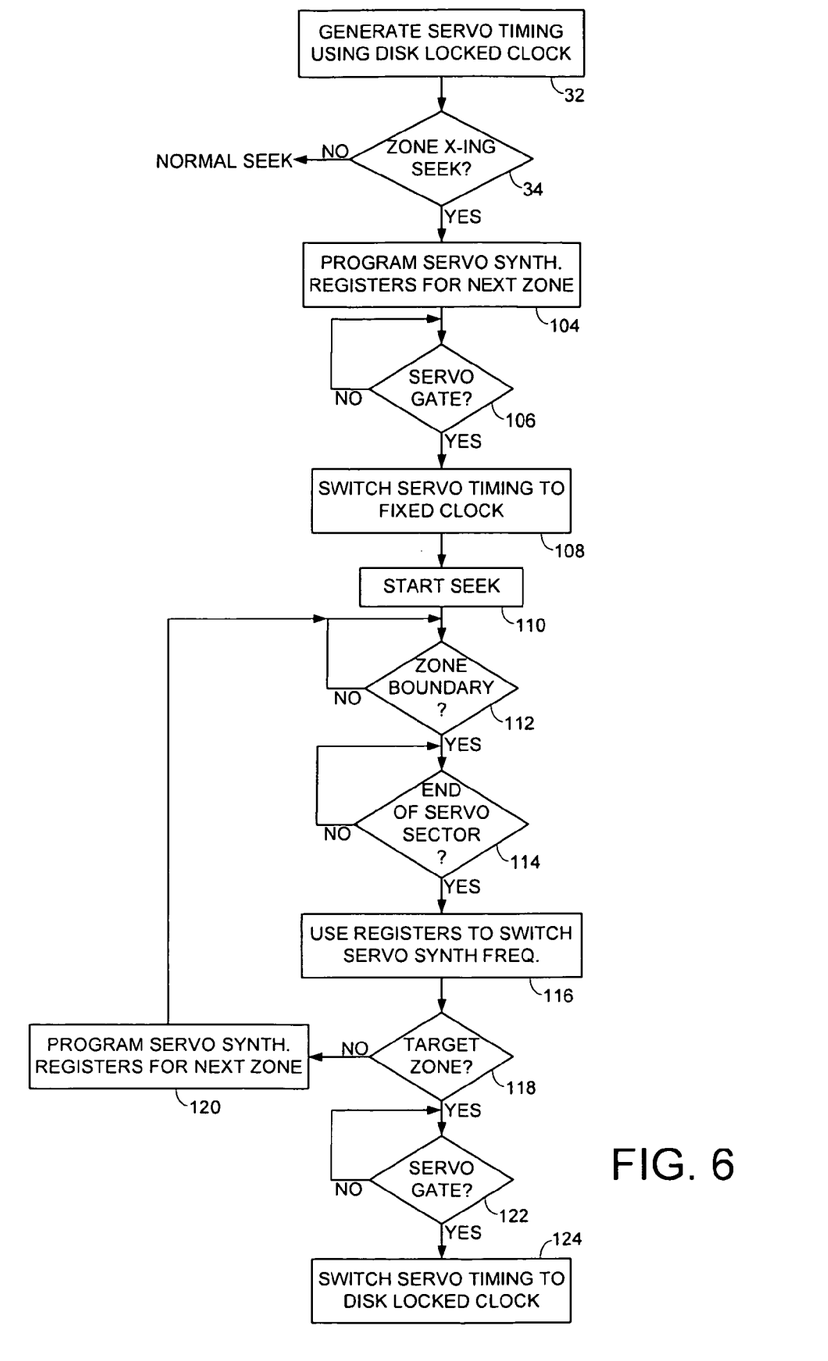
FIG. 6 is a flow diagram according to an embodiment of the present invention wherein the control circuitry switches to the fixed rate clock prior to executing the seek operation, and switches back to the disk locked clock after the head transitions into the target servo zone.

FIG. 6 shows a flow diagram according to an embodiment of the present invention which expands on the flow diagram of FIG. 2B. If a seek that crosses at least one servo zone is about to be executed (step 34), the registers for programming the servo frequency synthesizer 88 are configured for the next servo zone and armed (step 104). When the servo gate window is activated (step 106), the control circuitry switches to the fixed rate clock for generating the timing windows (step 108) and the seek is started (step 110). When the head reaches the boundary of the current servo zone (step 112) and then reaches the end of the last servo sector (step 114), the servo frequency synthesizer is configured (by the registers) to operate at the frequency of the next servo zone (step 116). If the head has not yet reached the target servo zone (step 118), the registers for programming the servo frequency synthesizer 88 are configured for the next servo zone and armed (step 120). If the head has reached the target servo zone (step 118), then when the servo gate window is activated (step 122), the control circuitry switches back to the disk locked clock for generating the timing windows (step 124).

Any suitable control circuitry may be employed to implement the flow diagrams in the embodiments of the present invention, such as any suitable integrated circuit or circuits. For example, the control circuitry may be implemented within a read channel integrated circuit, or in a component separate from the read channel, such as a disk controller, or certain steps described above may be performed by a read channel and others by a disk controller. In one embodiment, the read channel and disk controller are implemented as separate integrated circuits, and in an alternative embodiment they are fabricated into a single integrated circuit or system on a chip (SOC). In addition, the control circuitry may include a suitable preamp circuit implemented as a separate integrated circuit, integrated into the read channel or disk controller circuit, or integrated into an SOC.

In one embodiment, the control circuitry comprises a microprocessor executing instructions, the instructions being operable to cause the microprocessor to perform the steps of the flow diagrams described herein. The instructions may be stored in any computer-readable medium. In one embodiment, they may be stored on a non-volatile semiconductor memory external to the microprocessor, or integrated with the microprocessor in a SOC. In another embodiment, the instructions are stored on the disk and read into a volatile semiconductor memory when the disk drive is powered on. In yet another embodiment, the control circuitry comprises suitable logic circuitry, such as state machine circuitry.

What is claimed is:

1. A disk drive comprising:
   a disk comprising a plurality of servo sectors defining a plurality of servo tracks,
      wherein:
         each servo sector comprises a servo sync mark;
         the servo tracks form a plurality of servo zones; and
         a servo data rate of the servo sectors in a first servo zone is different than a servo data rate of the servo sectors in a second servo zone;
   a head actuated radially over the disk for generating a read signal; and
   control circuitry operable to:
      generate a fixed rate clock;
      generate a disk locked clock synchronized to the servo data rate of the servo zone the head is over;
      use the disk locked clock to generate a servo timing window relative to a circumferential location of the head and the servo sectors;
      seek the head from the first servo zone to the second servo zone; and
      switch to the fixed rate clock to generate the servo timing window while the head transitions from the first servo zone to the second servo zone.

2. The disk drive as recited in claim 1, wherein the servo timing window comprises a servo gate window enabled as the head approaches one of the servo sectors.

3. The disk drive as recited in claim 1, wherein the servo timing window comprises a sync mark window enabled as the head approaches the servo sync mark in one of the servo sectors.

4. The disk drive as recited in claim 1, wherein the control circuitry comprises a first frequency synthesizer for generating the disk locked clock and a second frequency synthesizer for generating the fixed rate clock.

5. The disk drive as recited in claim 4, wherein the control circuitry is further operable to program the first frequency synthesizer relative to the servo data rate of the servo zone the head is over.

6. The disk drive as recited in claim 1, wherein the control circuitry is further operable to switch to the fixed rate clock relative to when the servo timing window is enabled.

7. The disk drive as recited in claim 1, wherein the control circuitry is further operable to program the first frequency synthesizer to operate in the second servo zone after processing the last servo sector of the first servo zone.

8. The disk drive as recited in claim 1, wherein the control circuitry is further operable to switch to the fixed rate clock before the seek.

9. The disk drive as recited in claim 1, wherein the control circuitry is further operable to switch back to the disk locked clock after the head transitions to the second servo zone.

10. The disk drive as recited in claim 9, wherein the control circuitry is further operable to switch back to the disk locked clock after the seek.

11. A method of operating a disk drive, the disk drive comprising a disk comprising a plurality of servo sectors defining a plurality of servo tracks, wherein:
   each servo sector comprises a servo sync mark;
   the servo tracks form a plurality of servo zones; and
   a servo data rate of the servo sectors in a first servo zone is different than a servo data rate of the servo sectors in a second servo zone;
the disk drive further comprising a head actuated radially over the disk for generating a read signal, the method comprising:
   generating a fixed rate clock;
   generating a disk locked clock synchronized to the servo data rate of the servo zone the head is over;
   using the disk locked clock to generate a servo timing window relative to a circumferential location of the head and the servo sectors;
   seeking the head from the first servo zone to the second servo zone; and
   switching to the fixed rate clock to generate the servo timing window while the head transitions from the first servo zone to the second servo zone.

12. The method as recited in claim 11, wherein the servo timing window comprises a servo gate window enabled as the head approaches one of the servo sectors.

13. The method as recited in claim 11, wherein the servo timing window comprises a sync mark window enabled as the head approaches the servo sync mark in one of the servo sectors.

14. The method as recited in claim 11, wherein a first frequency synthesizer generates the disk locked clock and a second frequency synthesizer generates the fixed rate clock.

15. The method as recited in claim 14, further comprising programming the first frequency synthesizer relative to the servo data rate of the servo zone the head is over.

16. The method as recited in claim 11, further comprising switching to the fixed rate clock relative to when the servo timing window is enabled.

17. The method as recited in claim 11, further comprising programming the first frequency synthesizer to operate in the second servo zone after processing the last servo sector of the first servo zone.

18. The method as recited in claim 11, further comprising switching to the fixed rate clock before seeking the head.

19. The method as recited in claim 11, further comprising switching back to the disk locked clock after the head transitions to the second servo zone.

20. The method as recited in claim 19, further comprising switching back to the disk locked clock after the seek.

* * * * *